(12) United States Patent
Aharoni et al.

(10) Patent No.: US 9,043,727 B2
(45) Date of Patent: May 26, 2015

(54) VISUALIZATION TECHNIQUES FOR IMPRECISE STATEMENT COMPLETION

(75) Inventors: Avner Y. Aharoni, Seattle, WA (US); Henricus Johannes Maria Meijer, Mercer Island, WA (US); Andrew Eyring Kimball, Sammamish, WA (US); David N. Schach, Redmond, WA (US); Sravani Kothapalle, Redmond, WA (US); Ghanashyam Chandrasekhar Namboodiripad, Redmond, WA (US); Vladimir G. Sadov, Redmond, WA (US); Lisa Helene Feigenbaum, Bellevue, WA (US); Abel Valadez Martinez, Seattle, WA (US); Olivier Michel Destrebecq, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1339 days.

(21) Appl. No.: 11/828,711

(22) Filed: Jul. 26, 2007

(65) Prior Publication Data

US 2009/0030869 A1    Jan. 29, 2009

(51) Int. Cl.
*G06F 3/048* (2013.01)
*G06Q 10/00* (2012.01)
*G06F 3/01* (2006.01)

(52) U.S. Cl.
CPC ..................................... *G06Q 10/00* (2013.01)

(58) Field of Classification Search
CPC ... G06F 3/0236; G06F 3/0237; G06F 3/0482; G06F 17/3064; G06F 17/30277

USPC ............ 715/534, 716, 816, 843, 810; 725/37; 710/30; 348/552
See application file for complete search history.

(56) References Cited

U.S. PATENT DOCUMENTS

| | | | | | |
|---|---|---|---|---|---|
| 4,969,097 | A | * | 11/1990 | Levin | 715/234 |
| 5,724,457 | A | * | 3/1998 | Fukushima | 382/311 |
| 5,805,159 | A | * | 9/1998 | Bertram et al. | 715/764 |
| 5,864,340 | A | * | 1/1999 | Bertram et al. | 715/780 |
| 5,959,629 | A | * | 9/1999 | Masui | 715/808 |
| 6,002,390 | A | * | 12/1999 | Masui | 345/173 |
| 6,321,158 | B1 | * | 11/2001 | DeLorme et al. | 701/201 |
| 6,337,698 | B1 | * | 1/2002 | Keely et al. | 715/823 |
| 6,564,213 | B1 | | 5/2003 | Ortega et al. | |
| 6,675,169 | B1 | * | 1/2004 | Bennett et al. | 1/1 |
| 6,751,603 | B1 | | 6/2004 | Bauer et al. | |
| 6,879,691 | B1 | | 4/2005 | Koretz | |
| 7,127,707 | B1 | | 10/2006 | Mishra et al. | |

(Continued)

OTHER PUBLICATIONS

Explaining Search Results http://ijcai.org/papers/post-0210.pdf, International Joint Conferences on Artificial Intelligence, Published Date:—Aug. 2, 2005.

(Continued)

*Primary Examiner* — Nicholas Augustine
(74) *Attorney, Agent, or Firm* — Jim Banowsky; Kate Drakos; Micky Minhas

(57) ABSTRACT

When a user enters text into an application, the application can utilize an auto-complete feature to provide the user with estimations as to a complete term a user is attempting to enter into the application. Visualization can be provided along with an estimation to disclose the likelihood the estimation is what the user intends to enter. Furthermore, a rationale can be provided to the user for the reason an estimation was provided to the user.

24 Claims, 14 Drawing Sheets

(56) References Cited

U.S. PATENT DOCUMENTS

| | | | |
|---|---|---|---|
| 7,171,353 B2* | 1/2007 | Trower et al. | 704/9 |
| 7,194,404 B1* | 3/2007 | Babst et al. | 704/9 |
| 7,387,457 B2* | 6/2008 | Jawerth et al. | 400/489 |
| 7,447,627 B2* | 11/2008 | Jessee et al. | 704/10 |
| 7,689,684 B2* | 3/2010 | Donoho et al. | 709/224 |
| 8,015,482 B2* | 9/2011 | Simova et al. | 715/230 |
| 2002/0015042 A1* | 2/2002 | Robotham et al. | 345/581 |
| 2002/0024506 A1* | 2/2002 | Flack et al. | 345/169 |
| 2002/0052900 A1* | 5/2002 | Freeman | 707/531 |
| 2002/0156864 A1* | 10/2002 | Kniest | 709/217 |
| 2003/0084197 A1 | 5/2003 | Hill et al. | |
| 2004/0230987 A1 | 11/2004 | Snover et al. | |
| 2004/0239681 A1* | 12/2004 | Robotham et al. | 345/581 |
| 2005/0012723 A1* | 1/2005 | Pallakoff | 345/173 |
| 2005/0091531 A1 | 4/2005 | Snover et al. | |
| 2005/0114769 A1 | 5/2005 | Arkhipov et al. | |
| 2005/0195221 A1* | 9/2005 | Berger et al. | 345/660 |
| 2005/0223308 A1* | 10/2005 | Gunn et al. | 715/500 |
| 2005/0283364 A1* | 12/2005 | Longe et al. | 704/257 |
| 2006/0020904 A1* | 1/2006 | Aaltonen et al. | 715/850 |
| 2006/0026521 A1* | 2/2006 | Hotelling et al. | 715/702 |
| 2006/0026535 A1* | 2/2006 | Hotelling et al. | 715/863 |
| 2006/0026536 A1* | 2/2006 | Hotelling et al. | 715/863 |
| 2006/0075387 A1 | 4/2006 | Martin et al. | |
| 2006/0088356 A1* | 4/2006 | Jawerth et al. | 400/472 |
| 2006/0095842 A1* | 5/2006 | Lehto | 715/532 |
| 2006/0101005 A1* | 5/2006 | Yang et al. | 707/3 |
| 2006/0161870 A1* | 7/2006 | Hotelling et al. | 715/863 |
| 2006/0161871 A1* | 7/2006 | Hotelling et al. | 715/863 |
| 2006/0248078 A1 | 11/2006 | Gross | |
| 2006/0265648 A1* | 11/2006 | Rainisto et al. | 715/534 |
| 2006/0274051 A1* | 12/2006 | Longe et al. | 345/173 |
| 2007/0061704 A1* | 3/2007 | Simova et al. | 715/512 |
| 2007/0263007 A1* | 11/2007 | Robotham et al. | 345/581 |

OTHER PUBLICATIONS

Gutknecht, et al., The Zonnon Project: A .NET Language and Compiler Experiment:, http://people.inf.ethz.ch/~zueff/Publications/Plzen2005.pdf, Net Technologies 2005, 6 pages, Union Agency-Science Press Plzen, Czech Republic.

Madesen, et al. "Integration of BETA with Eclipse—an exercise in language interoperability", http://www.daimi.au.dk/~beta/eclipse/madsen.pdf, Last Accessed on Jul. 26, 2007, 18 pages, Department of Computer Science, University of Aarhus, Abogade 34, DK-8200 Arhus N. Denmark.

Schwartz, et al., "Kid's Programming Language (KPL)", http://www.k-p-l.org/Files/KPLpaperSIGGRAPH2006.pdf, Last Accessed on Jul. 26, 2007, 4 pages, Morrison Schwartz Inc.

Angelov, et al., "Visual Haskell: a Full-Featured Haskell Development Environment", http://delivery.acm.org/10.1145/1090000/1088350/p5-angelov.pdf?key1=1088350&key2=6745849711&coll=GUIDE&dl=GUIDE&CFID=19002870&CFTOKEN=12572935, Sep. 30, 2005, 12 Pages, Tallinn, Estonia, ACM.

* cited by examiner

| ENTRY | BOX | |
|-------|-----|---|
| BOXING (706a) | A NUMBER OF YOUR RECENT SEARCHES HAVE RELATED TO BOXING. (706b) | |
| BOXES (708a) | ACCORDING TO YOUR CREDIT CARD, YOU JUST PUT DOWN A SECURITY DEPOSIT ON A NEW APARTMENT. THEREFORE, YOU MAY BE INTERESTED IN MOVING BOXES (708b) | |
| FIGHT (710a) | TOMORROW NIGHT THERE IS BOXING MATCH FOR THE VACANT MIDDLEWEIGHT WORLD CHAMPIONSHIP. SINCE YOU HAVE SEARCH A NUMBER OF BOXING TOPICS, YOU COULD BE INTERESTED IN THIS FIGHT. USING THE TERM 'FIGHT' WILL BE MORE LIKELY TO GATHER RESULTS THAT RELATE TO THE MIDDLEWEIGHT FIGHT THEN THE TERM 'BOXING.' (710b) | |

FIG. 7

VISUALIZATION TECHNIQUES FOR IMPRECISE STATEMENT COMPLETION

TECHNICAL FIELD

The subject specification relates generally to computer applications and in particular to auto-completion statements of a computer application.

BACKGROUND

Computers have become an important part of society. Attainability of personal computers allows people of different backgrounds to use different applications. At one time, performances of computer operations were done by individuals with a high level of computer knowledge (e.g., people with mathematics/computer science degrees, dedicated hobbyists, etc.) However, as computers have become useful to the public, individuals with less computer knowledge have begun using high-level computer programs.

Furthermore, there are a relatively large number of applications available to use for different purposes. Thus, even highly knowledgeable individuals will likely have deficiencies in operating within new applications. Moreover, developments in memory size, processor speeds, graphical capabilities and the like allow applications to become highly complex. Therefore, individuals with a relatively sophisticated background can still be confused when operating within a new application due to a high application complexity.

An example of computer application development is progression of word processing programs. Originally, manual typewriters created formatted documents through mechanical manipulation of keys. Word processing machines grew from typewriters, where the machines function as dedicated units for producing documents. Personal computers configure with word processing applications that allow a user to produce documents from a multi-purpose machine. Conventional word processing applications include an array of features ranging from graphical capabilities to encryption configurations. It is more complex to operate a conventional word processing applications then a manual typewriter.

SUMMARY

The following presents a simplified summary of the specification in order to provide a basic understanding of some aspects of the specification. This summary is not an extensive overview of the specification. It is intended to neither identify key or critical elements of the specification nor delineate the scope of the specification. Its sole purpose is to present some concepts of the specification in a simplified form as a prelude to the more detailed description that is presented later.

Conventionally, when a user enters text in a computer application, an auto-complete function attempts to provide a user with a term the user is likely attempting to write. For example, a user can enter text 'app'. Two common terms that can be intended are 'apple' as well as 'application.' Since the computer application does not know what the user intended, items rank in order of likelihood of what the user desires to use.

The innovation provides an indicator as to a likelihood an auto-complete suggestion is what a user desires. As text enters a portion of a graphical user interface (GUI), a selection occurs to choose an estimated final text entry. For example, if there is entry of text 'tomorr', then it is likely the estimated final text entry will be 'tomorrow.' A configuration that performs the selection can have an indication as to a likelihood the estimated final text entry is what is intended. In this example, a ranking of one entry takes place since there is a relatively high likelihood the term 'tomorrow' is intended. The likelihood can translate to a visual indicator (e.g., percentage), be associated with the estimated final text entry, and present to a user thorough a GUI. Thus, a user is provided richer context as to auto-complete entries. Furthermore, a user can have an improved application experience since a user can operate with a greater level of certainty.

Moreover, the innovation can provide rationale to a user as to why a particular estimated final text entry is at a specific rank and/or why the entry was selected. Text entering a portion of a GUI can have different intended completions; for instance, text 'dance' can enter the portion of the graphical user interface. However, an entry 'dance' can have an intended completion of 'dance', 'dancer', and 'dancers.' Therefore, ranking takes place of three estimated completions (e.g., term with the highest likelihood of being intended is placed first.) Rationale used to give an estimated completion a rank can be associated with the estimated completion. The estimated completion and associated rank can be presented through the GUI. This is a different manner of treating a user; a system gives a user full knowledge as to a rationale and treats the user as a person who can understand and appreciate system operation. This differs from conventional systems that do not provide rationale to a user and do not allow a user to appreciate an experience fully (e.g., understand why an application is producing a particular result.)

The following description and the annexed drawings set forth certain illustrative aspects of the specification. These aspects are indicative, however, of but a few of the various ways in which the principles of the specification may be employed. Other advantages and novel features of the specification will become apparent from the following detailed description of the specification when considered in conjunction with the drawings.

BRIEF DESCRIPTION OF THE DRAWINGS

FIG. 7 illustrates a representative display with rationales in accordance with an aspect of the subject specification.

DETAILED DESCRIPTION

Figure 1:
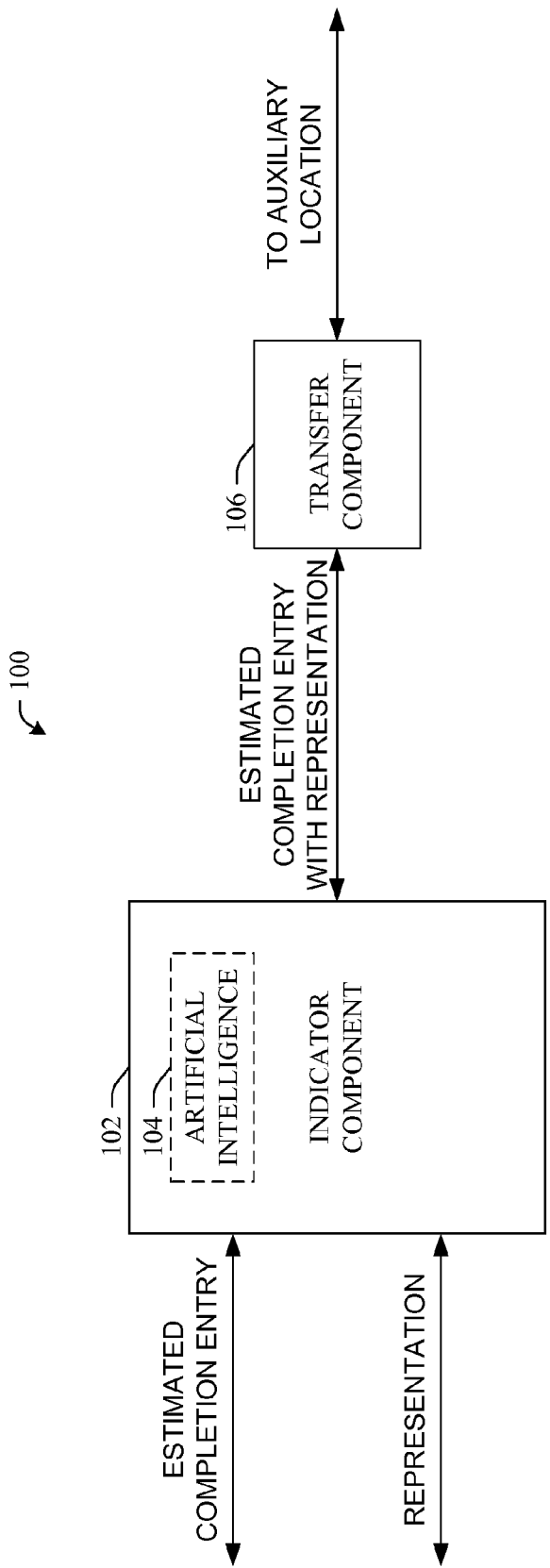
FIG. 1 illustrates a representative depiction attachment system in accordance with an aspect of the subject specification.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

As used in this application, the terms "component," "module," "system", "interface", or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

FIG. 1 discloses an example system 100 for application of a visual indication with an estimated completion. An indicator component 102 receives an estimated completion entry as well as a representation of likelihood that the estimated completion entry is proper. The indicator component 102 associates an estimated completion entry with a representation of a likelihood of the estimated completion entry being a proper entry. When the estimated completion entry arrives at the indicator component 102, various functions can occur. An analysis of entered information allows for gathering of metadata that relates to a suggested completion. Metadata can be used in an association as well as be obtained for record keeping purposes (e.g., monitoring use of the system 100.)

The indicator component 102 can utilize artificial intelligence 104 in associating the estimated completion entry with the representation. The artificial intelligence 104 makes at least one inference or at least one determination or at least one of each in relation to association of a suggestion entry with the representation of the likelihood. Various scenarios can occur that are processed by the artificial intelligence 104. For example, a user can be playing an online trivia game where points are scored for correct answers. The artificial intelligence 104 can make a determination that since the game is likely being played to challenge a user's knowledge on topics, it would be detrimental to provide completions that give information outside of the user's knowledge. Therefore, the indicator component 102 can function as a stopper and not allow for presentment of a completion entry.

Artificial intelligence 104 can employ one of numerous methodologies for learning from data and then drawing inferences and/or creating making determinations related to association of a representation (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems.

An estimated completion entry integrated with a representation moves from the indicator component 102 to a transfer component 106. The transfer component 106 emits the estimated completion entry associated with the representation to an auxiliary location (e.g., a display component.) The transfer component 106 can operate in a wireless or wired manner. In addition, a notification can be received by the transfer component 106 that relates to reception of the estimated completion entry with representation to the auxiliary location (e.g., a notice that there was successful reception by the auxiliary location.) The transfer component 502 can include a processor that performs a check upon information before there is emission (e.g., a determination if at least one error is present.)

Figure 2:
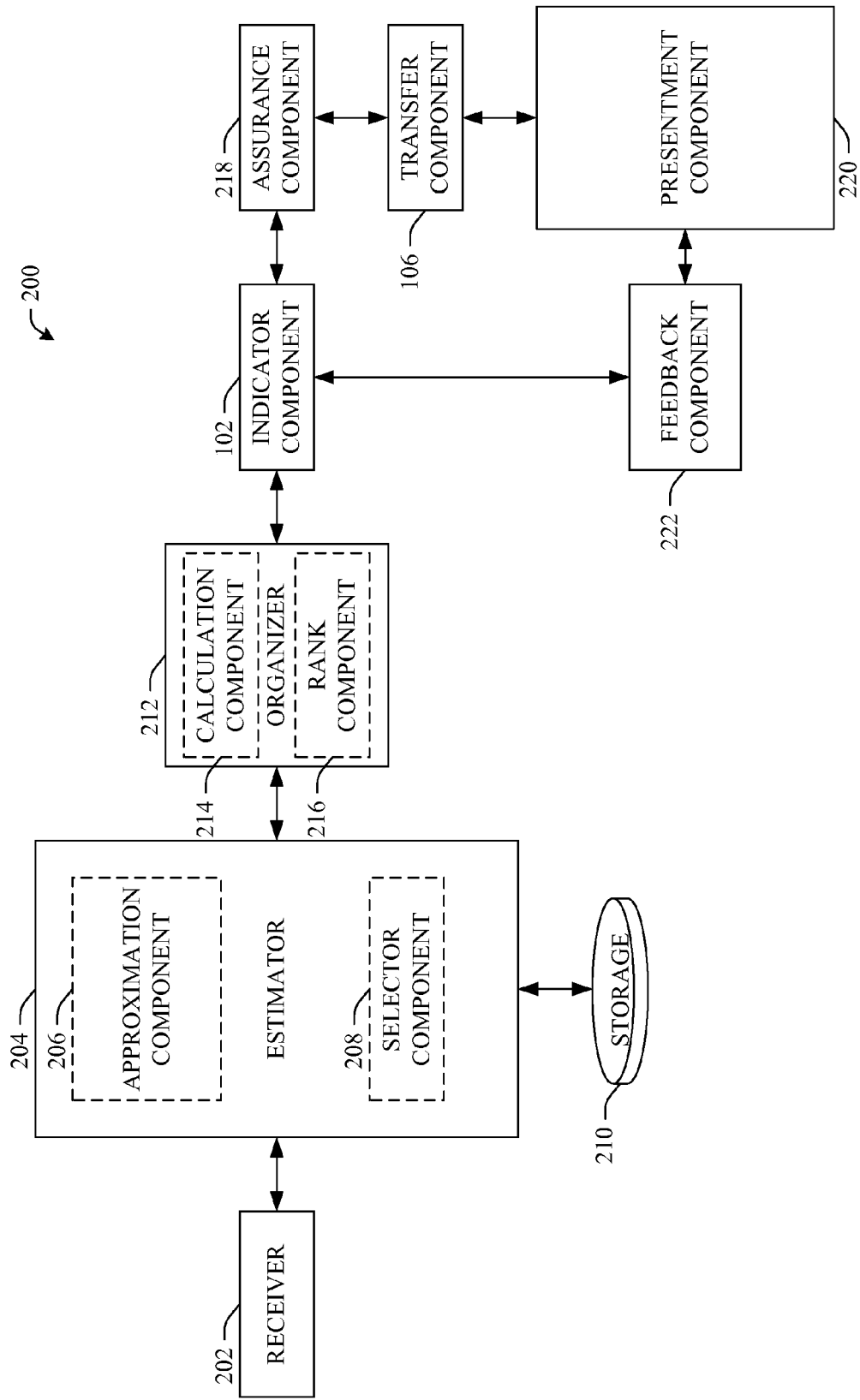
FIG. 2 illustrates a representative depiction integration system in accordance with an aspect of the subject specification.

FIG. 2 discloses an example representation application system 200. A receiver 202 gathers various information types that relate to system operation. A user enters information to the system 200 that can be subject to an auto-complete application. Entered information is commonly an input entry that is at least partially completed. The receiver 202 can integrate with a graphical user interface (GUI) that allows a user to enter text. Moreover, the receiver 202 can utilize a microphone that allows the user to speak an entry into the system 200.

An estimator 204 makes predictions based on the input entry. An estimator 204 can hold an approximation component 206 and a selector component 208. The approximation component 206 creates at least one estimated completion entry from an input entry that is at least a partially completed. An input entry can have a large number of possible completions. For example, entry of the term 'any' can result in at with various possible completions such as 'any', 'anyone', 'anybody', 'anytime', 'anywhere', 'any place', 'any locations', etc. The approximation component 206 uses internal logic to determine an appropriate possible completion for presentation to a user. According to one embodiment, some completion entries are selected while others are discarded. The internal logic can use artificial intelligence 104 of FIG. 1 when making a determination.

The selector component 208 chooses a representation of a likelihood for association with the estimated completion entry. Various representations can be available for use and a representation can have characteristics that can have different levels of applicability. For example, one possible representation can be a computer-generated voice that speaks an estimated auto-completed entry. However, if the system does not include speakers, then an audio representation would be ineffective and undesirable. The selector component 208 can configure to optimize a representation and/or decide on an adequate representation. The selector component 208 can send a representation directly to the indicator component 102 as well as to other system components (e.g., an organizer 212.)

The estimator 204 can utilize storage 210 when performing a prediction operation. The storage 210 typically includes a database of different representations that can be used by the selector component 208. Furthermore, other components of the system 200 can utilize the storage 210 for various purposes and operations. For instance, the receiver 202 can create a log in the storage 210 for a received input entry. The log can be used to track operations of the system 200 and to determine errors that occur (e.g., if an input entry is not processed and lost, then there is a log that can be used to prove existence of the input entry.)

An organizer 212 can include a calculation component 214 and a rank component 216. The calculation component 214 determines the likelihood of the estimated completion entry being proper. A proper entry is an entry that obtains a desired and/or intended result (e.g., a term being what a user intended to place, a term that obtains a result desired by a user, etc.) A user can input a term 'fox' and the approximation component 206 can determine that two completions that should be presented to a user are 'foxes' and 'foxy.' Storage 210 can hold a history of previous engagements of an electronic device utilizing the system 200. The calculation component 214 can access the storage 210 to determine how likely 'foxes' and 'foxy' are to match what a user desires. A user entering text has performed previous searches that relate to groundhogs, squirrels, and raccoons. Since other searches have concerned similar mammals, it is likely that the user is intending to use 'foxes' rather then 'foxy.' Therefore, 'foxes' will have a relatively high scoring calculation while 'foxy' will have a relatively lower score.

Scoring can be independent of other auto-completion entries. Therefore, if percentages are used as a representation, then the numbers do not need to equal 100%. For instance, a user can enter a term 'wreslt' and the approximation component 206 can provide three auto-complete entries for selection: 'wrestle', 'wrestler', and 'wrestling.' All three can be proper entries and a user can have success regardless of which auto-complete entry is used. Therefore, high percentages can be used for individual auto-completion entries that do not need to add to 100%.

A rank component 216 orders at least one estimated completion entry, commonly within a subset. In a case where there is about one estimated completion entry, the rank component 216 places the entry first. When there are about two or more estimated completion entries, the rank component 216 places them in an order. The rank component 216 can used different rationales to place auto entries in an order. Rationale examples include placing higher scoring auto-complete entries at the top, alphabetical, random, etc. Furthermore, the rank component 216 can include logic to determine placement if a tie occurs (e.g., if two auto-completion entries have a same score when scoring is used as the rationale, then entries are ordered alphabetically.)

The indicator component 102 associates an estimated completion entry with a representation of a likelihood of the estimated completion entry being a proper entry. Association can include linking the representation with the estimated completion entry. In addition, association can include integrating the representation with an appropriate indicator (e.g., forming one unit.) For example, the selector component 208 can choose that percentages be used as the representation. The calculation component 214 computes percentages of likelihood of auto-completion entries being proper. The indicator component 102 links the selected representation with the auto-complete entry. Furthermore, associating includes completing a representation by placing the representation in a state that is concurrent with a linked auto-complete entry (e.g., if a percentage is 80% likely of being proper, then the representation reflects the term '80%)

An assurance component 218 integrates at least one criterion for engagement with the estimated completion entry associated with the representation. It can be desirable to have different engagement criterion for selecting an auto-complete entry. For example, a user can be utilizing a highly sensitive database application where a single error can cause numerous difficulties. The assurance component 218 can make it more difficult to select an auto-completion entry that has a relatively low likelihood of being proper. An illustration allows a user holds down a mouse button for a longer time for a low likelihood auto-completion then for a high likelihood auto-completion.

A transfer component 106 processes information from the assurance component to a presentment component 220. The presentment component 220 can function as an auxiliary location. Various embodiments of the presentment component 220 can be a monitor, speaker, device capable of transmitting Morse code, Braille output unit, etc.

A feedback component 222 gathers reaction information that relates to association of the estimated completion entry with the representation. Gathering reaction information can be done in a passive manner as well as an active manner. In a representative passive manner, the feedback component 222 makes a determination if a used entry matches a provided completion entry. In an illustrative active manner, the feedback component 222 poses at least one question to a user based on the quality of an auto-completion presentment.

According to one embodiment, the system 200 can operate in a computer programming application. Some programming languages use objects, and an auto-complete entry can produce suggestions that exist as objects. For example, if a user types 'dat' and one object 'database' starts with the three letters 'dat', then one auto-complete entry is shown. That allows for a level of certainty since auto-complete entries relate to known objects.

For example, the system 200 can use three different levels of certainty: none, partial, or matched/almost certain. The different levels of certainty can use a traffic light configuration for representation (e.g., none=red, partial=yellow, matched=green.) A user can write text in an entry location of a computer language: 'directory/holdings/'; 'directory/holdings/' functions as a partial entry. In one configuration, 'holdings' holds one file named 'alpha.' Therefore, there is a matched certainty that a user wants 'alpha' since it represents what is located in holdings. The indicator component 102 can place a green light next to a presented term 'alpha.'

However, the system 200 can include two files in 'holdings': 'alpha' and 'beta.' In one embodiment, many other engagements of the computer language have a user requesting 'alpha' from 'holdings' and thus it is more likely then not that a user would want 'alpha' over 'beta' A partial representation can associate with 'alpha' (e.g., a yellow light.) The computer language can also function without previous engagements and thus there is no distinguishing between 'alpha' and 'beta.' Under this scenario, there can be no level of certainty as to one entry being more proper then another. Therefore, both 'alpha' and 'beta' can associate with red lights.

Figure 3:
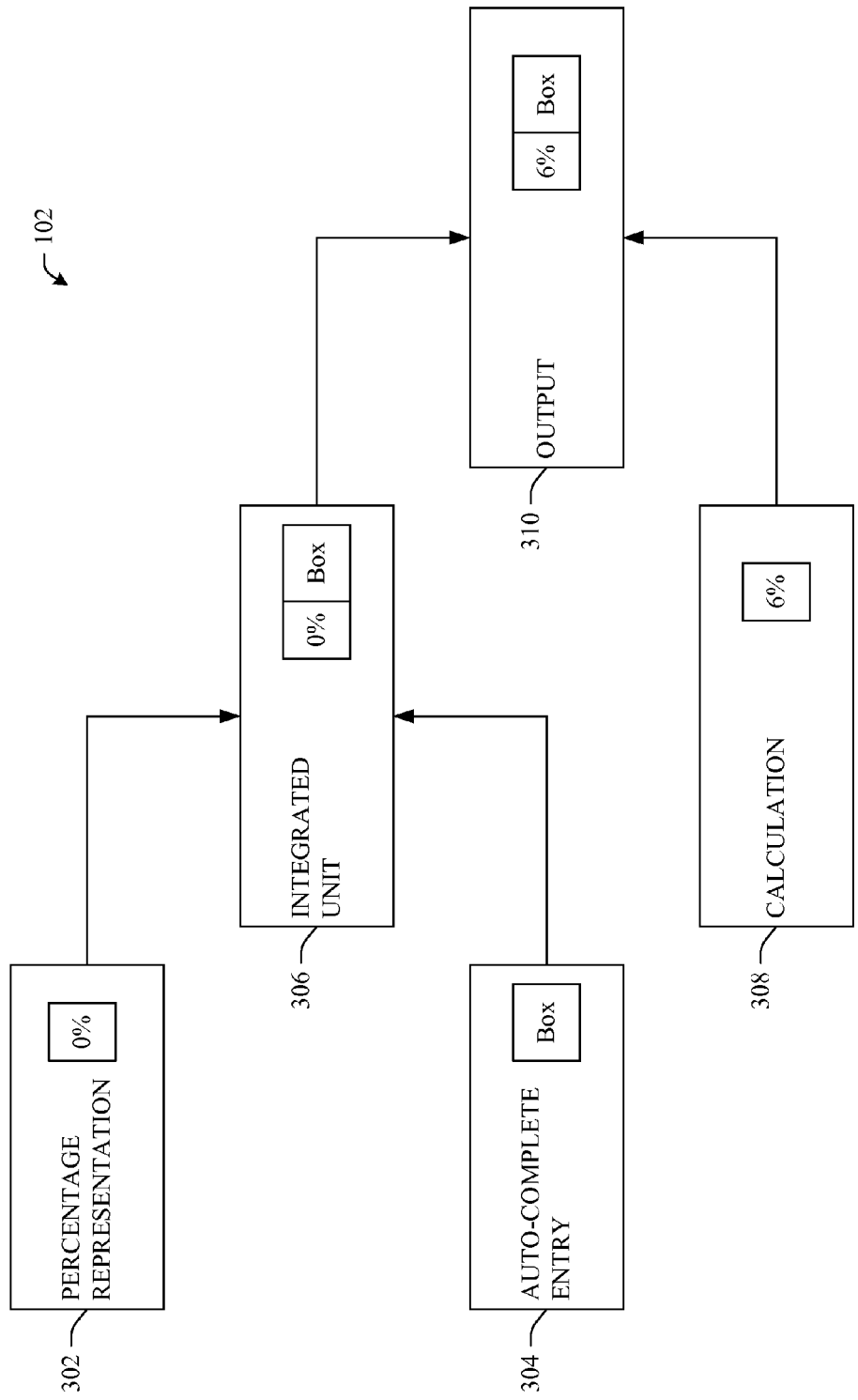
FIG. 3 illustrates a representative operation of an indictor component in accordance with an aspect of the subject specification.

FIG. 3 discloses an example operation of an indicator component 102. A percentage representation 302 can enter the indicator component 102 from a production location (e.g., organizer 212 of FIG. 2.) An actual percentage is left blank (e.g., left at 0%) since an actual value has not yet been provided. In addition, an auto-complete entry 304 can enter the indicator component 102 and be based off text entered by a user through a GUI. The indicator component 102 can combine the percentage representation 302 with the auto-complete entry 304 to create an integrated unit 306.

The indicator component 102 can receive a calculation 308 that relates to the auto-complete entry 304. The calculation is the likelihood of the auto-complete entry being a proper entry (e.g., an entry desired by a user, an entry that will produce a result a user targeted, etc.) For instance, there can be a 6% likelihood the auto-complete is what a user desires. The indicator component 102 can integrate the calculation 208 into the percentage representation portion of the integrated unit to for an output 310. The output 310 can travel to the transfer component 106 of FIG. 1 for emission to an auxiliary location.

FIG. 4a to FIG. 4d disclose example outputs of the transfer component 102 of FIG. 1. In the figures, there is a depiction of three completion entries that are provided for an example entry 'box': 'boxing', 'boxes', and 'fight.' A rank component 216 of FIG. 2 can place a term 'boxing' first when a user has performed a number of other searches that relate to fighting forms (e.g., mixed martial arts, Greco-roman wrestling, etc.) A completion entry 'boxes' can be presented second based on example rationale that when general users type 'box', they often intend 'boxes' and thus general trends are taken into account.

A term 'fight' lists as a completion entry with a relatively low ranking. The approximation component 206 can include logic to make determinations for auto-complete entries that do not contain information entered. If a user has previously entered information for various fighting forms, then it is likely a general term 'fight' will obtain information that is relevant to what a user desires (e.g., a user running an online search.) It is to be appreciated that an estimated completion entry does not require to be a physical completion of an input entry. An estimated completion entry is an approximated conclusion submission that is based off an input entry (e.g., 'fight' is based off 'boxing' that can be intended from 'box.')

Figure 4A:
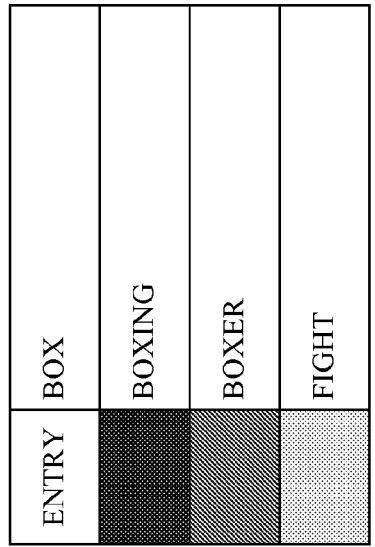
FIG. 4a illustrates a representative display with numerical percentages in accordance with an aspect of the subject specification.
Figure 4B:
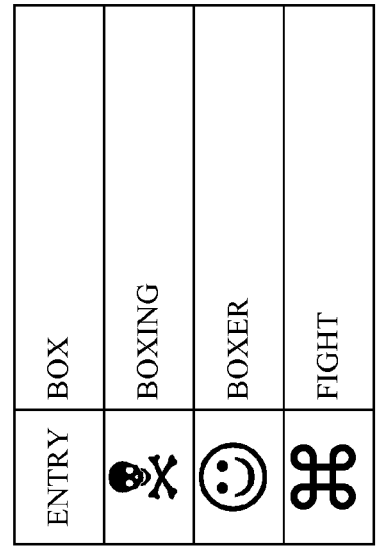
FIG. 4b illustrates a representative display with shades in accordance with an aspect of the subject specification.
Figure 4C:
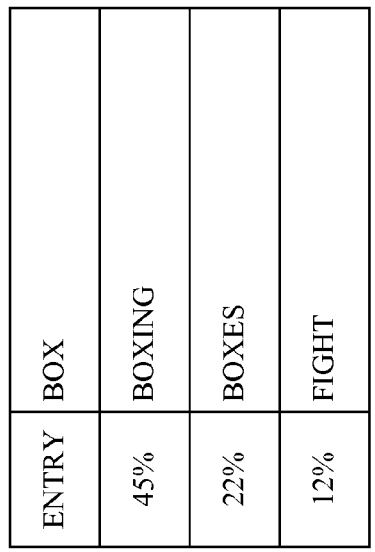
FIG. 4c illustrates a representative display with lines in accordance with an aspect of the subject specification.
Figure 4D:
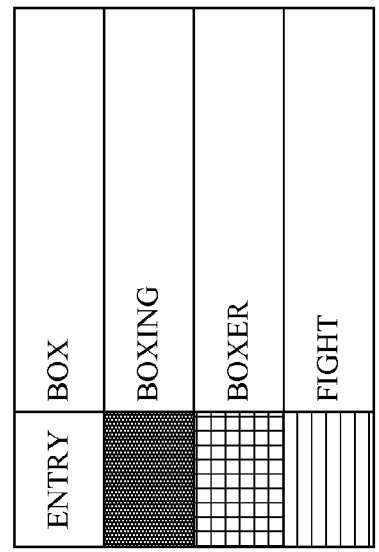
FIG. 4d illustrates a representative display with symbols in accordance with an aspect of the subject specification.

FIG. 4a discloses an example output of the transfer component 106 of FIG. 1 using a percentage representation. Entries with higher percentages are listed towards the top where percentages represent a likelihood of a completion entry being proper. FIG. 4b discloses an illustration production of the transfer component 106 of FIG. 1 using a shading depiction. Darker entries are provided at the top while lighter entries appear toward the bottom. Thus, a darker marking indicates a higher likelihood of certainty that an entry is what is desired by a user. FIG. 4c discloses an instance output of the transfer component 106 of FIG. 1 using a lined illustration. Heavier lined indicators are placed at the top (e.g., entries with a higher likelihood of being proper.) FIG. 4d discloses an illustrative production of the transfer component 106 of FIG. 1 using a symbol representation. Different symbols can be used to provide different likelihoods. The symbols can be independent to a system and be specifically configured for different users (e.g., a user can use a tool to allow for a pirate symbol to be used to show an item with a matched likelihood, a pirate symbol indicates a highest likelihood, etc.)

Figure 5:
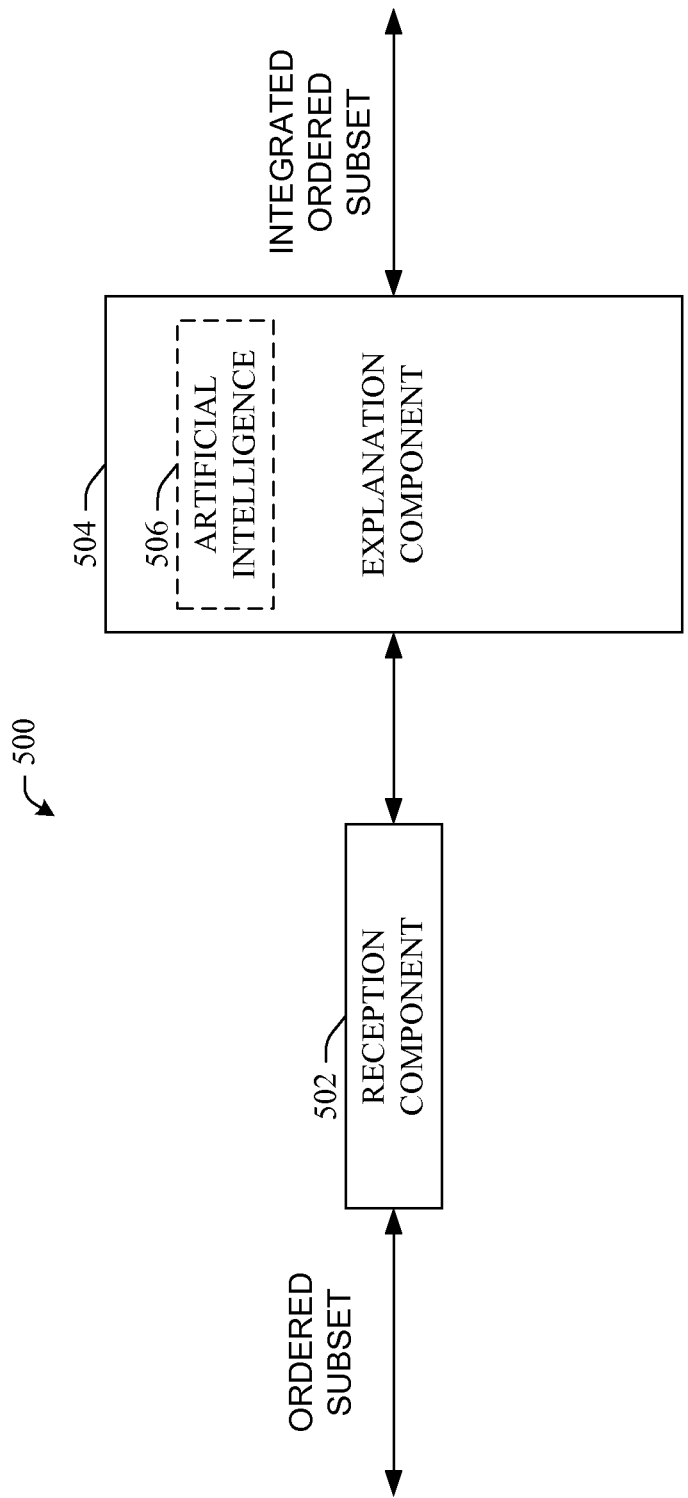
FIG. 5 illustrates a representative rationale integration system in accordance with an aspect of the subject specification.

FIG. 5 discloses an example system 500 for creation of a suggestion entry integrated with a rationale. The reception component 502 can obtain an ordered subset of at least one estimated completion entry from an auxiliary location. Operation can take place in both a wireless and hard-wire context. Furthermore, the auxiliary location can be a local position or a remote locality.

An explanation component 504 integrates at least one estimated completion entry with a rationale for placement of the estimated completion entry in the ordered subset. When an entry places in a subset, there is a reason for a particular placement. For example, an entry is situated first because it relates to previous searches performed by a user. Moreover, if an entry lies in a position due to random selection, then a rationale can indicate that placement is due to an arbitrary assortment. A rationale can include one reason, multiple reasons, etc. The explanation component 504 outputs an ordered subset integrated with at least one rationale.

The explanation component 504 can employ artificial intelligence 506 to assist in operation. Artificial intelligence 506 makes at least one inference or at least one determination or at least one of each in relation to integration of at least one estimated completion entry with the rationale for placement. Various scenarios can occur that are processed by the artificial intelligence 506. For example, a user can be operating an application on a device with a relatively small display screen. Presentation of rationale can become counter-productive since the rationale will likely become cumbersome by occupying a large part of a display screen. Therefore, the indicator component 102 can function as a stopper and not allow for presentment of a completion entry.

Artificial intelligence 506 can employ one of numerous methodologies for learning from data and then drawing inferences and/or creating making determinations related to integration of rationale (e.g., Hidden Markov Models (HMMs) and related prototypical dependency models, more general probabilistic graphical models, such as Bayesian networks, e.g., created by structure search using a Bayesian model score or approximation, linear classifiers, such as support vector machines (SVMs), non-linear classifiers, such as methods referred to as "neural network" methodologies, fuzzy logic methodologies, and other approaches that perform data fusion, etc.) in accordance with implementing various automated aspects described herein. Methods also include methods for the capture of logical relationships such as theorem provers or more heuristic rule-based expert systems.

Figure 6:
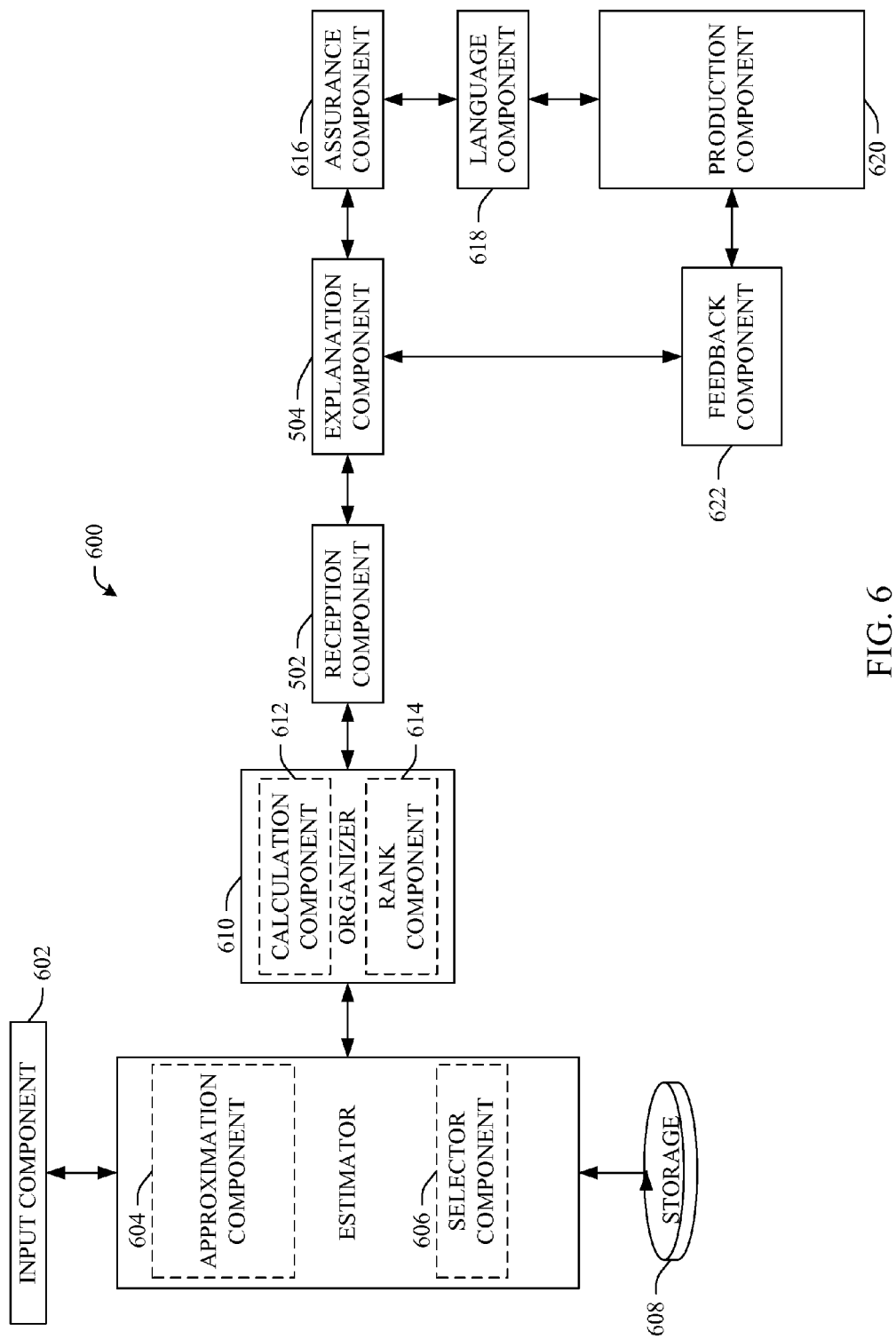
FIG. 6 illustrates a representative rationale association system in accordance with an aspect of the subject specification.

FIG. 6 discloses an example system 600. An input component 602 allows for entry of information that can be subjected to an auto-completion. Commonly, the input component 602 allows a user to place information into the system 600. However, the system 600 can operate independent of a user. An auxiliary unit attempting to access a file can operate the input component 602. The system 600 can communicate a rationale to the auxiliary unit so the unit can perform an informed action. The input component 602 can include a keyboard, microphone, etc.

An estimator 602 can include an approximation component 604 and a selector component 606. The approximation component 604 creates at least one estimated completion component entry from an input entry that is at least partially completed. For example, entry of the term 'whe' can result in the following possible completions: 'where', 'wherever', 'when', 'whenever', etc. The approximation component 206 uses internal logic to determine an appropriate possible completion for presentation to a user. The internal logic can use artificial intelligence 506 of FIG. 5 when making a determination.

The selector component 606 can choose about one or more estimated completion entries for association with rationale. The approximation component 604 can determine there are fourteen possible completions that could be appropriate. However, a user could become confused with presentation of fourteen choices. Therefore, the selector component 606 functions to limit choices presented to a user. The selector component 606 can make estimations to limit choices or use an output of other components (e.g., calculation component) in making a determination.

Various components of the system 600 can utilize storage 608 in operations. Storage 608 allows for retention of information in the system 600 that can be used at a later time. A selector component 606 can determine success of previous rationale presentations. A user can have difficulties understanding a certain rationale format (e.g., bullet points.) A record of problems can be made in storage 608 and be accessible to the selector component 606. In further engagement, the selection component 606 can choose a different rationale format (e.g., sentences) based on confusion of a previous format.

An organizer 610 can include a calculation component 612 and a rank component 614. The calculation component 612 can operate in conjunction with the selector component 606. Computations are made that relate to an auto-completion entry; for example, a computation can occur as to a likelihood a completion entry will be of interest to a user. The rank component 614 creates the ordered subset of at least one estimated completion entry. Output of the calculation component 612 is used to create the subset. For instance, completion statements with a relatively high likelihood of being interesting are placed first in the ordered subset. Creation of an ordered subset can take place generically (e.g., a blank template is created and then filled with suggestions) or inherently (e.g., placement of different suggestions inherently creates a subset.)

A reception component 502 obtains an ordered subset of at least one estimated completion entry. The reception component 502 can include a processor that performs a check upon received information (e.g., a determination if at least one error is present.) An explanation component 504 integrates at least one estimated completion entry with a rationale for placement of the estimated completion entry in the ordered subset. The explanation component 504 can analyze the ordered subset and determine why the rank component 614 placed an entry in a position of the subset. Moreover, the explanation component 504 can determine why the approximation component 604 and/or selector component 606 choose an entry for placement in the subset. The explanation component 504 can integrate a rationale based off an analysis.

An assurance component 616 associates at least one criterion for engagement with the estimated completion entry associated with the rationale. It can be attractive to encompass diverse engagement conditions for choosing a suggestion entry. For instance, an operator can be utilizing a precision manufacturing system where a single error can cause a substantial defect in a finished product. The assurance component 218 can create difficulties in allowing an auto-completion entry that has a relatively low likelihood of being proper for selection. According to one embodiment, an operator is asked to confirm a lower likelihood selection.

The system 600 can utilize a language component 618 to place the rationale into a vernacular. Typically, the system 600 operates with computer code (e.g., binary values) and thus does not subscribe to one language (e.g., English, Polish, Arabic, etc.) However, for a user to appreciate a rationale quickly, the rationale should convert to a language understandable to a user. For instance, a user can commence operation of the system 600 through loading a personal profile held in storage 608. The profile can contain a vernacular that a user commonly engages. Vernacular can include both a language (e.g., English) as well as a particular dialect (e.g., Great Lakes English.) The language component 618 accesses the profile and determines a language to use in conversion of the rationale.

A production component 620 can disclose about one or more estimated completion entries integrated with the rationale for placement. Commonly, the production component 620 operates visually; however, there can be non-visual productions (e.g., audio.) The production component 620 can be a monitor, speaker, device capable of transmitting Morse code, Braille output unit, etc. It is to be appreciated that various components disclosed in the subject specification can integrate together. For example, the input component 602 and the production component 620 can integrate together to form one unit. Furthermore, the production component 620 and the presentment component 220 of FIG. 2 can operate as a single entity.

A feedback component 622 gathers reaction information that relates to integration of the estimated completion entry with rationale. Gathering reaction information can be done in a passive manner as well as an active manner. In a representative passive manner, the feedback component 622 makes a determination if a used entry matches a provided completion entry. In an illustrative active manner, the feedback component 622 poses at least one question to a user based on the quality of an auto-completion presentment.

According to one embodiment, the system 600 can operate in a computer programming application. Some programming languages use objects, and an auto-complete entry can produce suggestions that exist as objects. For example, if a user types 'dat' and one object 'database' starts with the three letters 'dat', then one auto-complete entry is shown. That allows for a level of certainty since auto-complete entries relate to known objects.

In the specified embodiment, the system 600 can include two files in a folder 'holdings': 'alpha' and 'beta.' In one interaction, many other engagements of the computer language have a user requesting 'alpha' from 'holdings' and thus it is more likely then not that a user would want 'alpha' over 'beta' There can be presentation of a rationale 'Many other users have desired 'alpha' from 'holdings', so it is listed first.' A concurrent rationale can align with 'beta.'

FIG. 7 discloses an example output 700 of operation of the system 600. A user can have a heading box 702 that instructs a user where to place information. An entry area 704 allows a user to input information. Below the entry area are three suggestion completions 706a, 708a, and 710a. The three suggestion completions are identical to what is disclosed in FIG. 4a to FIG. 4d. However, completion entries include a concurrent rationale 706b, 708b, and 710b. Rationales can include why an entry was selected, why an entry was given a specific placement in an ordered set, etc.

Figure 8:
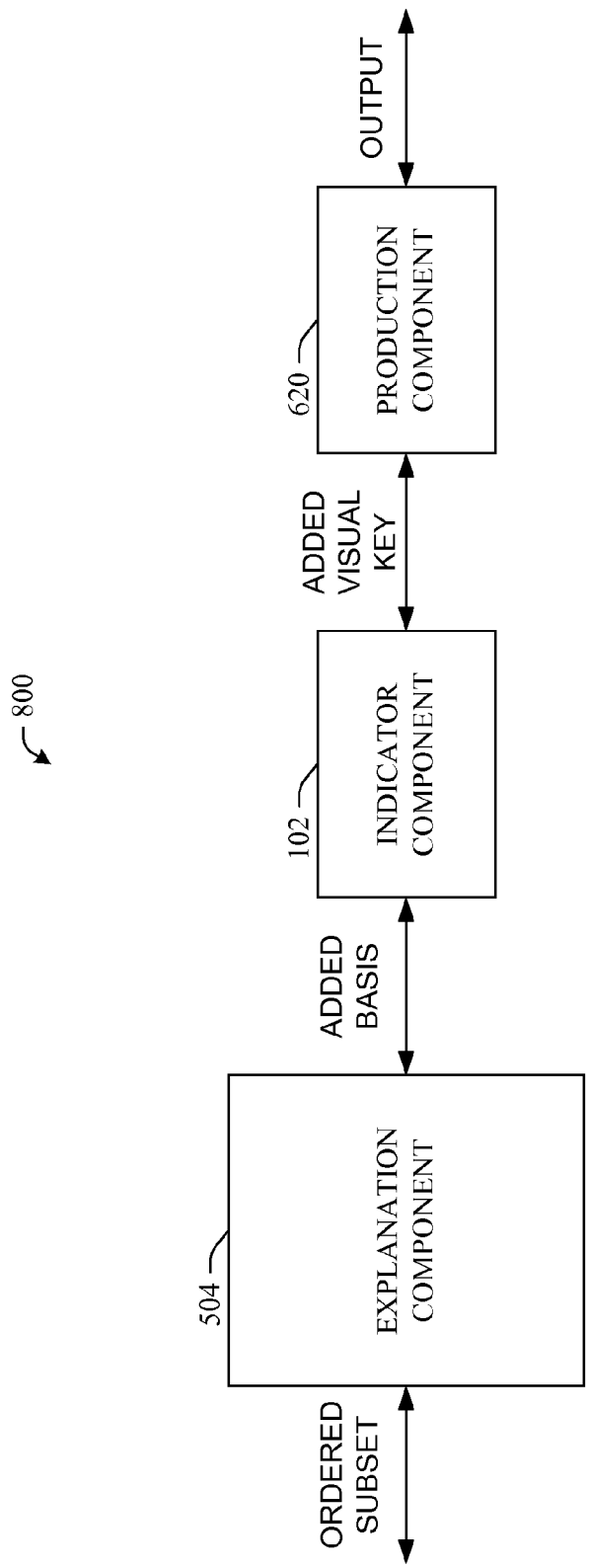
FIG. 8 illustrates a representative depiction attachment and rationale integration system in accordance with an aspect of the subject specification.

FIG. 8 discloses an example system 800 for presentment of at least one completion entry with a visual indicator. A completion entry can enter an explanation component 504. The explanation component 504 can function as a means for augmenting the illustrative depiction with a rationale for correlation of the evaluation of a comprehensive reflection.

An indicator component 102 associates a representation of likelihood with a completion entry. The indicator component 102 can operate as a means for correlating an evaluation of a comprehensive reflection with a illustrative depiction of a probability that the evaluation of a comprehensive reflection is an adequate reflection A production component 620 presents the completion entry with both the representation and the rationale. The production component 620 can engage as a means for revealing the estimation of the comprehensive reflection with the correlated illustrative depiction. Moreover, the production component 620 can reveal the rationale and the estimation of the comprehensive reflection with the correlated illustrative depiction.

Figure 9:
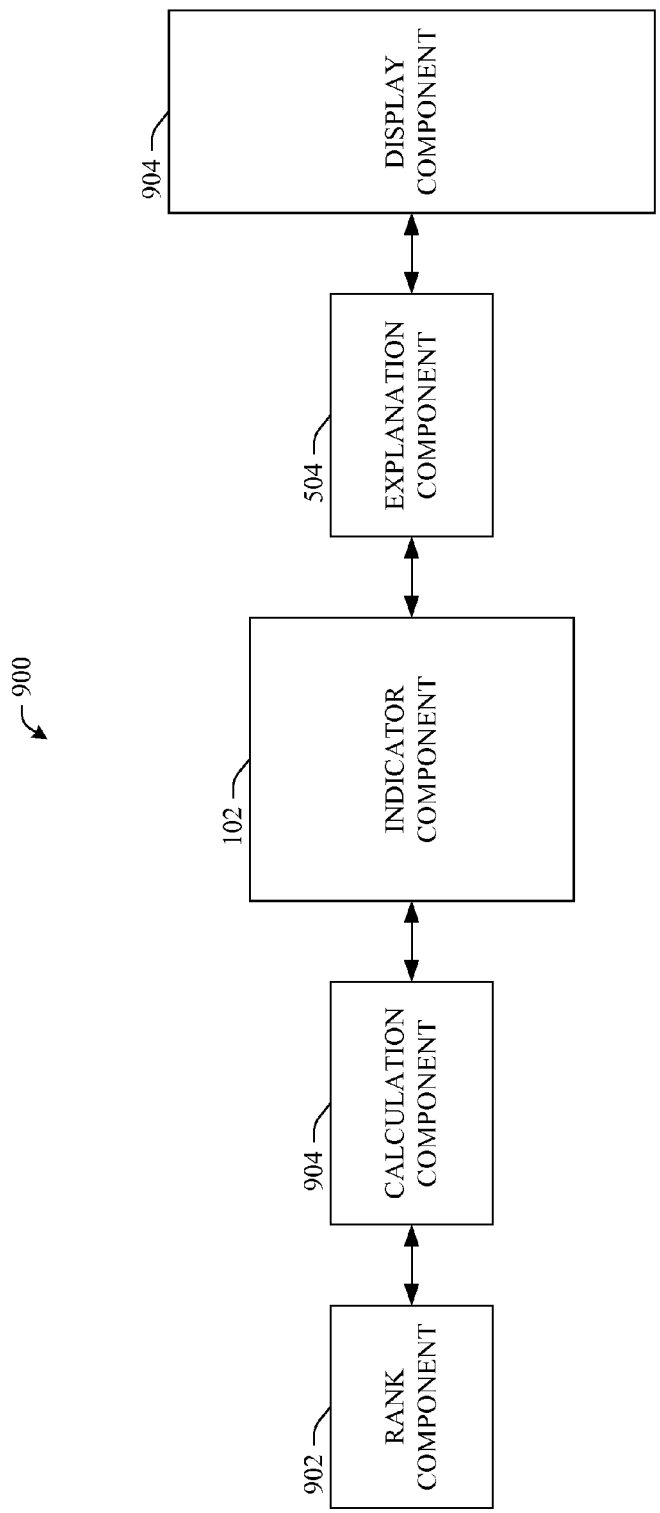
FIG. 9 illustrates a representative depiction integration and rationale attachment system in accordance with an aspect of the subject specification.

FIG. 9 discloses a system 900 for presentment of a suggestion entry with a rationale and/or an indicator of likelihood of the entry being proper. A rank component 902 can create an ordered subset as well as place at least one suggestion entry into an ordered subset. The rank component 902 can operate as a means for positioning at least one estimated completion entry based on a likelihood of an estimated completion entry being a proper.

A calculation component 904 can perform at least one computation that relates to operation of the system 900. According to one configuration, the calculation component 904 is a means for calculating the likelihood of the estimated completion entry being a proper entry. The calculation component 904 can include logic that allows for checking validity of computations. If an error is discovered, then the calculation component 904 can attempt to correct the error.

An indicator component 102 allows a user to appreciate a likelihood of a suggested entry to be what a user intends. The indicator component 102 can configure to function as a means for associating an estimated completion entry with a representation of a likelihood of the estimated completion entry being proper. Commonly the representation is visual; however, various non-visual embodiments can be practiced.

An explanation component 504 augments various pieces of information with a suggestion entry. The explanation component 504 can be a means for augmenting an estimated completion entry with rationale for association of an estimated completion entry with a representation. Furthermore, the explanation component 504 can augment the estimate completion entry with reasoning for placement in an ordered subset as well as why a completion entry was given a specific position in the ordered subset.

A display component 906 allows for presentment of information produced by other components of the system 900 as well as information of components not shown. The display component 906 can develop as a means for presenting the estimated completion entry with the visual representation and the rationale. Typically, the display component produces information in a visual context.

Figure 10:
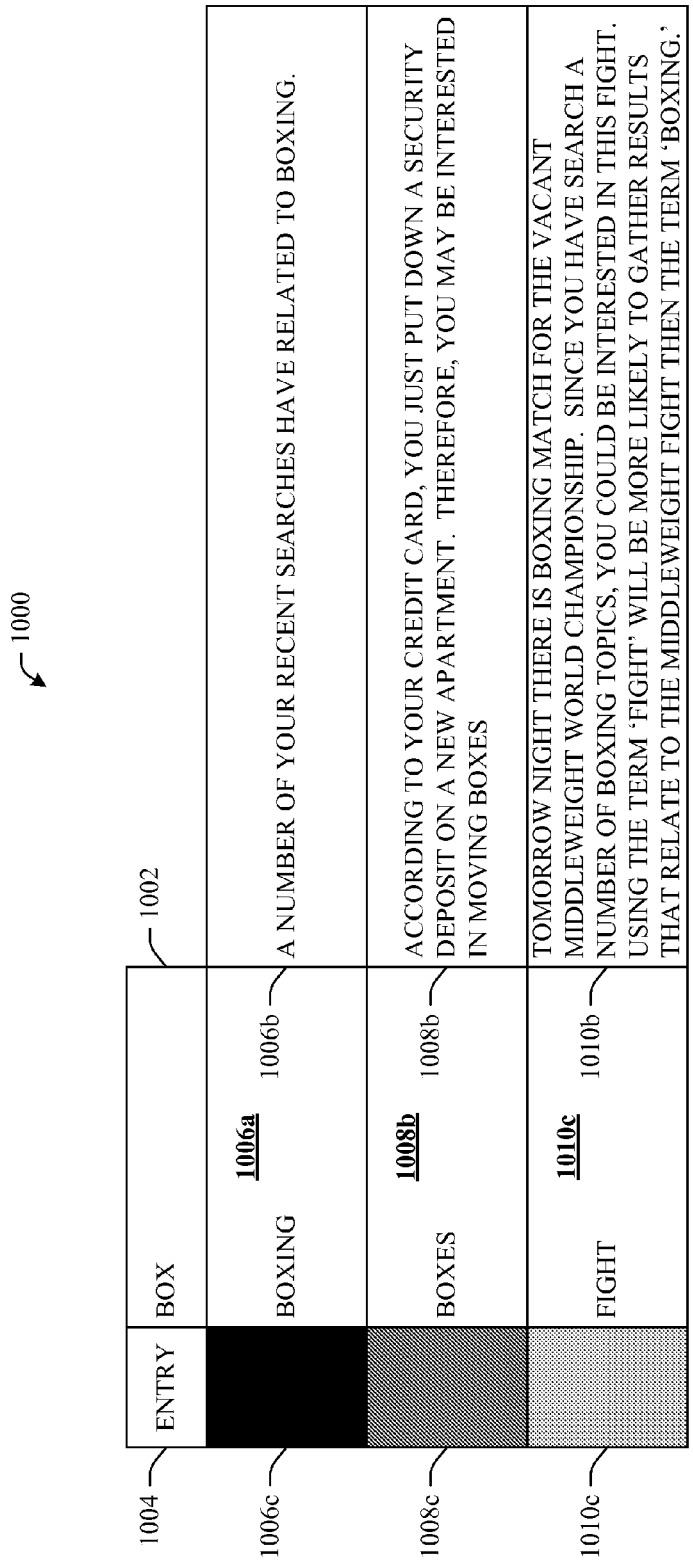
FIG. 10 illustrates a representative display with rationales and shades in accordance with an aspect of the subject specification.

FIG. 10 discloses an example output 1000 of system 800 of FIG. 8 and of system 900 of FIG. 9. A user places an entry into a text box 1002 next to a heading area; example entry is the term 'box.' Three different completion entries present to a user: 'boxing' 1006a, 'boxer' 1008a, and 'fight' 1010a. The completion entries integrate with two different items. A first item is a rationale 1006b, 1008b, and 1010b as to why a completion entry is selected and/or why a completion entry is given a particular rank. A second item is an indicator 1006c, 1008c, and 1010c as to a likelihood of an entry being proper. While contrast indicators are used, it is to be appreciated that various visual and non-visual indicators can be implemented (e.g., a text voice stating "boxing, high likelihood, a number of your recent searches have related to boxing.") A user can engage the complete entry, indicator, and/or rationale to place a completion entry into the text box.

Figure 11:
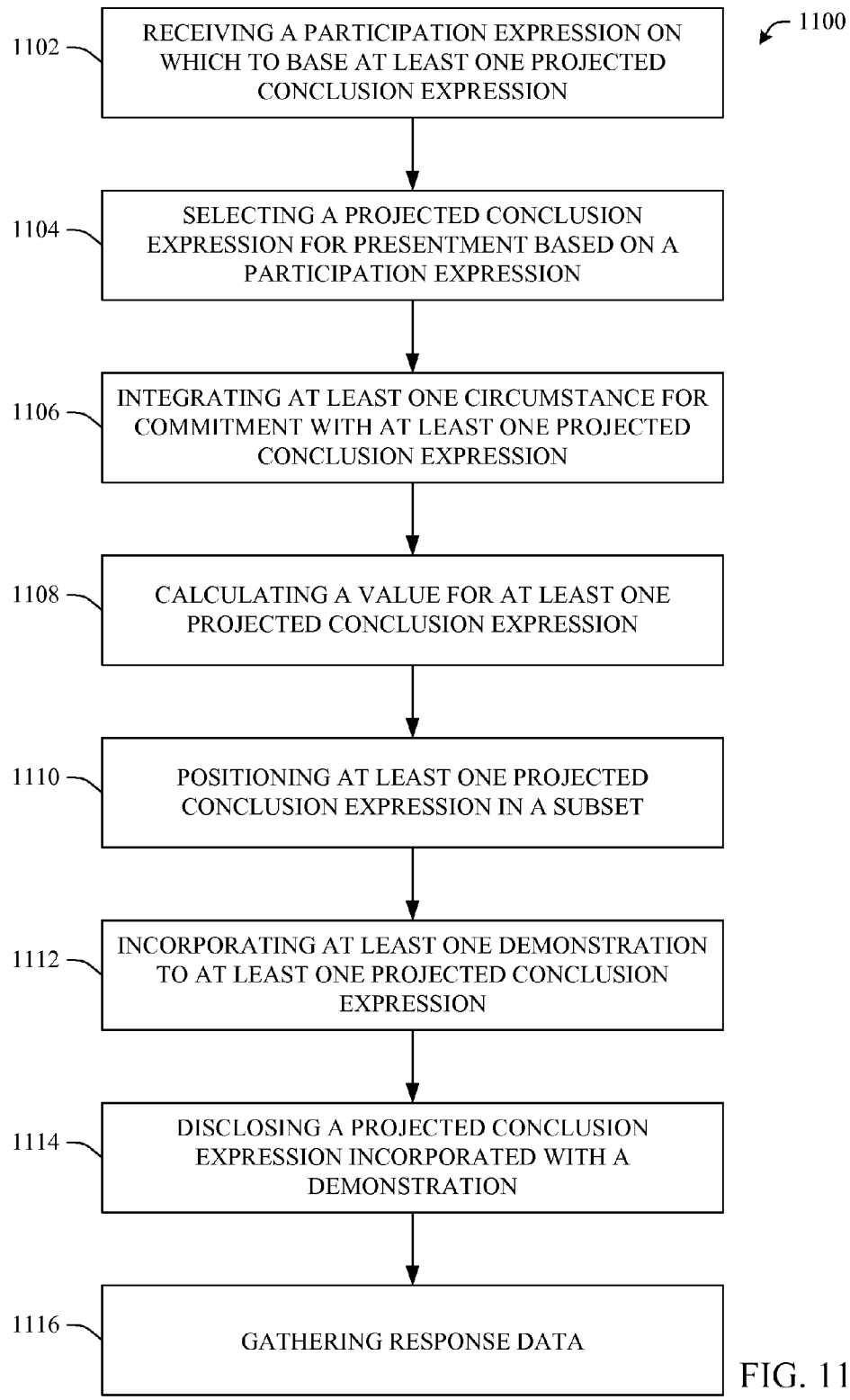
FIG. 11 illustrates a representative visualization incorporation methodology in accordance with an aspect of the subject specification.

FIG. 11 discloses an example methodology 1100 for integration of a representation with a completion entry. Action 1102 is receiving a participation expression on which to base at least one projected conclusion expression. Reception of a completion entry can take placed in a number of different manners. This includes obtainment from a location within a unit operating the methodology 1100 as well as from a supplemental position.

Selecting a projected conclusion expression for presentment based on a participation expression 1104 can occur. Different expressions can have different impacts on different users and action 1104 can enable an optimized choice for an expression. For instance, a user can sign into a computer running the methodology 1100 through a personal profile. Profile information can indicate that the user is color-blind. Therefore, an expression that uses different colors to signify a likelihood of relevance would be ineffective. Act 1104 can make a determination that an expression using light-to-dark should be used and select the expression.

There can be an integrating at least one circumstance for commitment with at least one projected conclusion expression 1106. In order for a user to engage a suggested entry, the user typically meets certain criteria. Action 1106 assigns at least one criterion to a suggested entry. For example, a user contacts a GUI presentment on a touch screen to engage the suggested entry. If a suggested entry has less certainty of being proper, then more pressure is to be applied to the GUI presentment for proper engagement.

Event 1108 is calculating a value for at least one projected conclusion expression. A value can be a numerical result (e.g., two times out of three a suggestion entry will produce a desired result), a classification result (e.g., it is 'likely' an auto-complete statement will provide a desired result), etc.

Furthermore, different conclusion expressions can have different value characteristics. One expression can have a numerical value assigned while another has a classification value assigned.

Positioning at least one projected conclusion expression in a subset 1110 transpires. Often times, a statement with a high likelihood of being proper is shown first to a user. Positioning can also include selection of expressions for presentment. For example, there can be ten possible expressions while three top expressions will be presented to a user. Positioning inherently selects three expressions for presentment since the three placed at the top are presented expressions. Action 1110 can use a calculated value of act 1108 in positioning at least one projected conclusion expression in a subset.

There can be an incorporating at least one demonstration to at least one projected conclusion expression 1112. Incorporation can create a new entity that a system operating the methodology 1100 treats as one (e.g., the new entity cannot be broken at a later time.) This can be where the demonstration relates to at least one criterion used to position the projected conclusion expression. For example, a relationship can be that the demonstration is a percentage that was used in positioning.

Act 1114 is disclosing a projected conclusion expression incorporated with a demonstration. This allows a user to appreciate an incorporated unit and take further actions upon the unit. A user can evaluate information presented through the unit and make an informed decision as to how to proceed in an application (e.g., selecting a completion entry for user or continuing without utilization of an entry.)

Gathering response data 1116 from various locations can take place. Response data can relate to positioning of at least one projected conclusion in the subset, incorporating at least one demonstration to at least one projected conclusion expression, at least one criterion used to position the projected conclusion expression, or a combination thereof. Response data can be used for modification of various actions disclosed in the methodology 1100. It is to be appreciated that at least some actions of FIG. 10 and FIG. 11 can combine to operate in synchronization.

Figure 12:
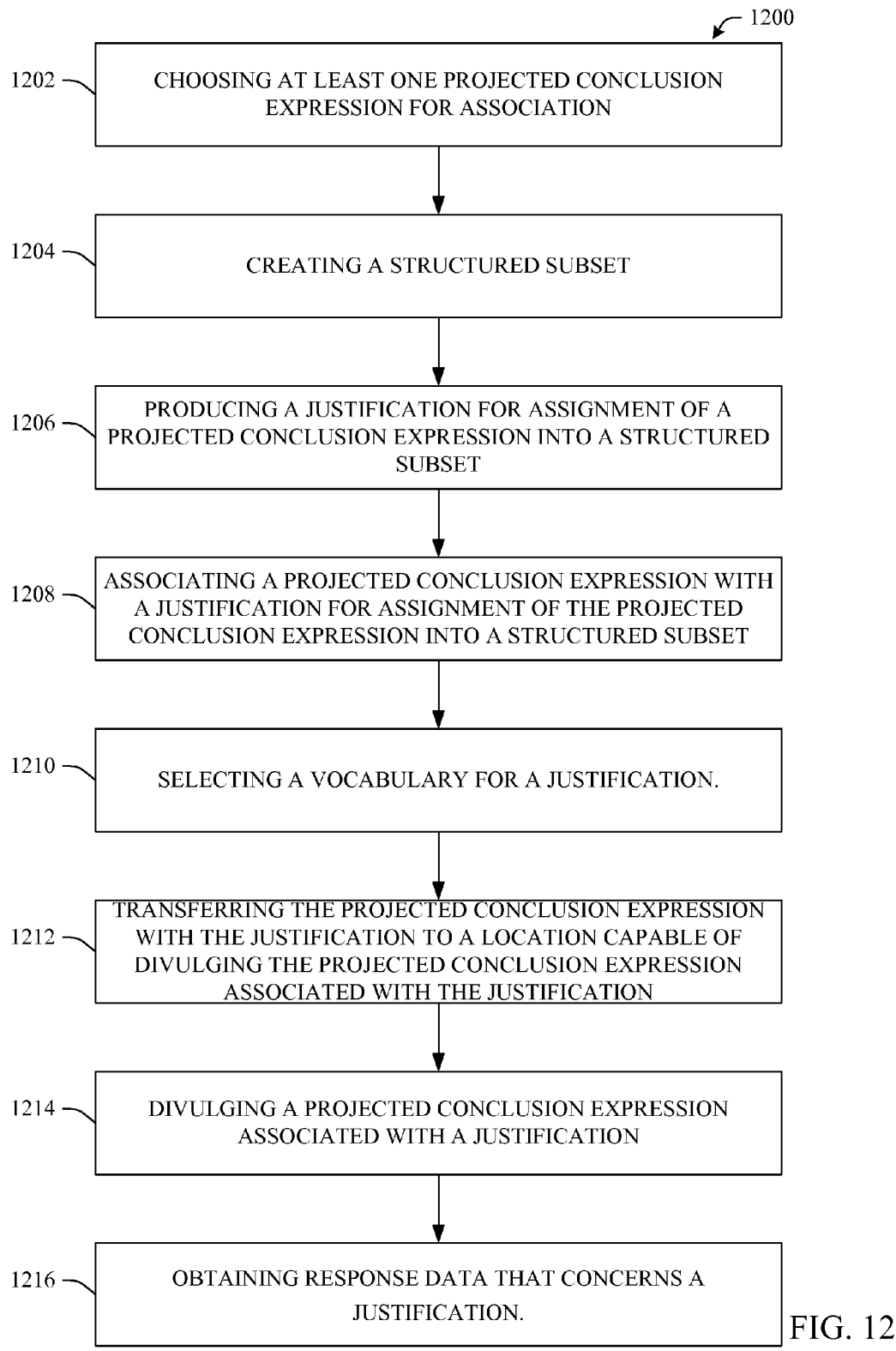
FIG. 12 illustrates a representative rationale integration methodology in accordance with an aspect of the subject specification.

FIG. 12 discloses a methodology 1200 for disclosing a suggestion entry with a rationale. Event 1202 is choosing at least one projected conclusion expression for association. A user can enter text information to obtain a desired result. The methodology 1200 can obtain the information and choose conclusions based off obtained information.

There can be an occurrence of creating a structured subset 1204. A created subset contains at least one suggested conclusion from action 1202. In addition, creation of an ordered subset includes placing entries in different positions of the subset. If there are three entries, then action 1204 places the three entries in an order based on at least one selected metric (e.g., alphabetical, 50% personal previous engagement and 50% general previous engagements, etc.)

Action 1206 is producing a justification for assignment of a projected conclusion expression into a structured subset. An entry that is placed in the subset will have a motive for placement. A motive can be highly technical (e.g., result of a complex equation.) or random. A produced justification can transfer to various locations, including into storage.

Associating a projected conclusion expression with a justification for assignment of the projected conclusion expression into a structured subset 1208 can take place. An expression can link with a rationale for placement in a subset. This can allow a user to appreciate a provided entry and allow the user to make an informed selection. Association can be a hard relationship (e.g., creating a new unit) or soft relationship (e.g., expression and justification retain separate properties.)

Selecting a vocabulary for a justification 1210 occurs in the methodology 1200. In order for there to be proper appreciation of a rationale (e.g., by a user), the rationale should be placed in a language that is understandable. Vocabulary selection can include both a language (e.g., English) as well as terms to be used (e.g., terms understandable to a person with a third-grade reading level.) It is to be appreciated that a selected vocabulary can be binary code used by a computer system (e.g., information expressed as I/Os.)

There can be transferring the projected conclusion expression with the justification to a location capable of divulging the projected conclusion expression associated with the justification 1212. A suggested entry and rationale can move to a presentation unit (e.g., monitor, speakers, etc.) Act 1214 can be divulging a projected conclusion expression associated with a justification. This can include presentation to a user as well as presentation to an electronic device and/or other component.

There can be occurrence of obtaining response data that concerns a justification 1216. Response data can be used to improve various events disclosed in the methodology 1200. Gathering a response data can include passive actions (e.g., observing how a user responds to a presentation) as well as active (e.g., asking a user to complete a survey that relates to an experience with a presentation.)

It is to appreciate that while various visual representations are shown, other visual representation as well as non-visual representation can also be employed. According to one embodiment, when a user holds a mouse pointer over an auto-complete entry display, a noise sounds from speakers. Different likelihoods can produce different sounds and/or different rates (e.g., amount of time between repetitive sounds.)

For purposes of simplicity of explanation, methodologies that can be implemented in accordance with the disclosed subject matter were shown and described as a series of blocks. However, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed throughout this specification are capable of being stored on an article of manufacture to facilitate transporting and transferring such methodologies to computers. The term article of manufacture, as used, is intended to encompass a computer program accessible from any computer-readable device, carrier, or media.

Figure 13:
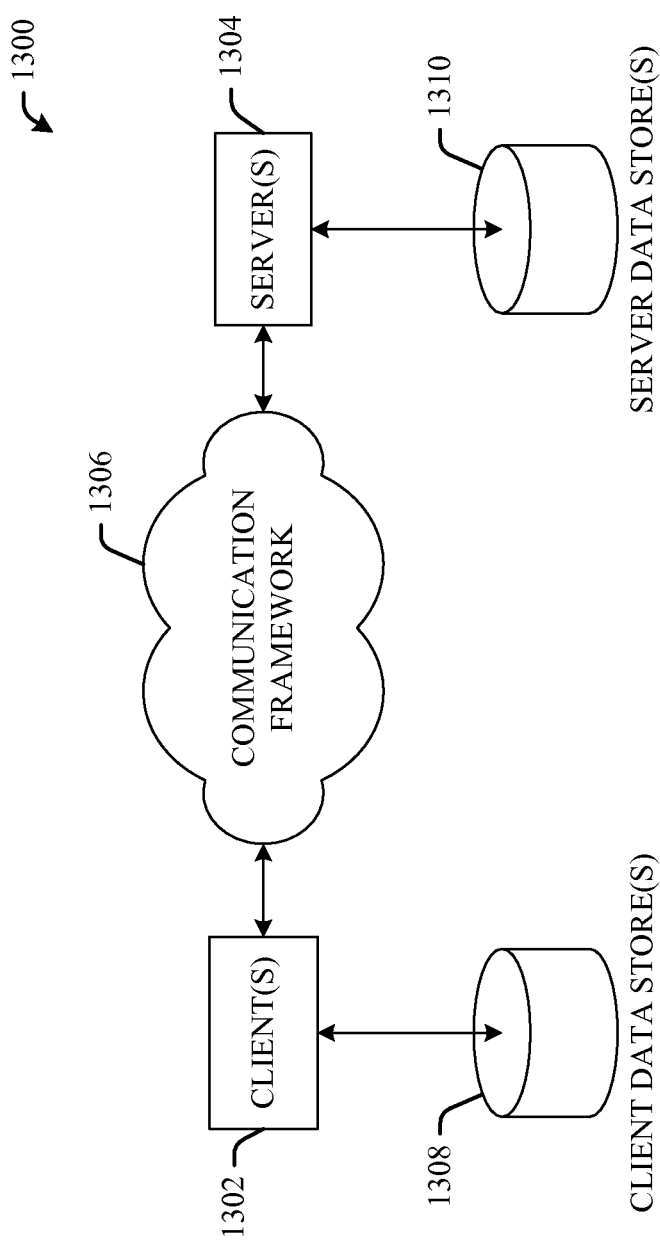
FIG. 13 illustrates an example of a schematic block diagram of a computing environment in accordance with the subject specification.
Figure 14:
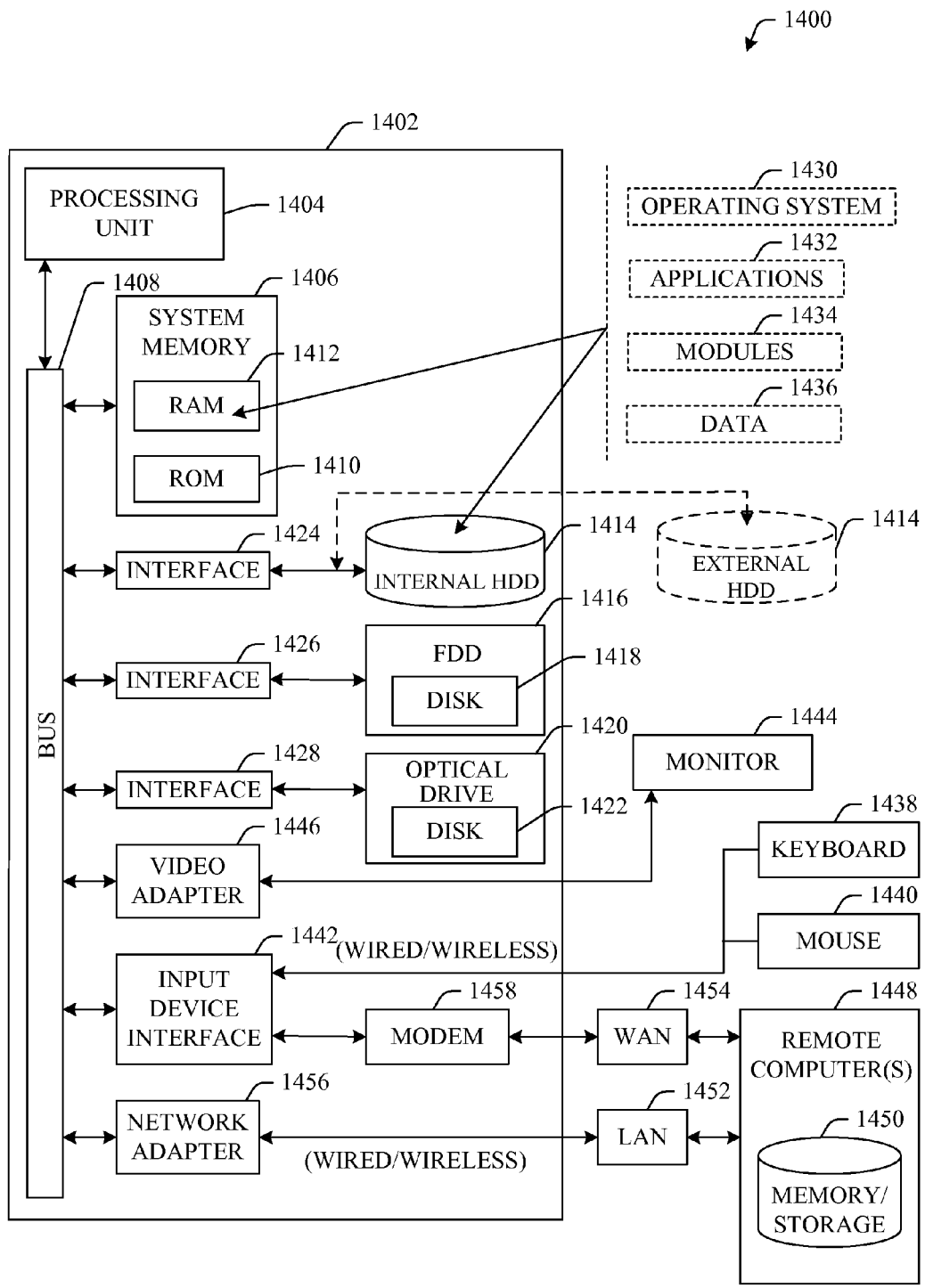
FIG. 14 illustrates an example of a block diagram of a computer operable to execute the disclosed architecture.

In order to provide a context for the various aspects of the disclosed subject matter, FIGS. 13 and 14 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject matter described herein also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

Referring now to FIG. 13, there is illustrated a schematic block diagram of a computing environment 1300 in accordance with the subject specification. The system 1300 includes one or more client(s) 1302. The client(s) 1302 can be hardware and/or software (e.g., threads, processes, computing devices). The client(s) 1302 can house cookie(s) and/or associated contextual information by employing the specification, for example.

The system 1300 also includes one or more server(s) 1304. The server(s) 1304 can also be hardware and/or software (e.g., threads, processes, computing devices). The servers 1304 can house threads to perform transformations by employing the specification, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

Referring now to FIG. 14, there is illustrated a block diagram of a computer operable to execute the disclosed architecture. In order to provide additional context for various aspects of the subject specification, FIG. 14 and the following discussion are intended to provide a brief, general description of a suitable computing environment 1400 in which the various aspects of the specification can be implemented. While the specification has been described above in the general context of computer-executable instructions that may run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 14, the example environment 1400 for implementing various aspects of the specification includes a computer 1402, the computer 1402 including a processing unit 1404, a system memory 1406 and a system bus 1408. The system bus 1408 couples system components including, but not limited to, the system memory 1406 to the processing unit 1404. The processing unit 1404 can be any of various commercially available processors. Dual microprocessors and other multi-processor architectures may also be employed as the processing unit 1404.

The system bus 1408 can be any of several types of bus structure that may further interconnect to a memory bus (with or without a memory controller), a peripheral bus, and a local bus using any of a variety of commercially available bus architectures. The system memory 1406 includes read-only memory (ROM) 1410 and random access memory (RAM) 1412. A basic input/output system (BIOS) is stored in a non-volatile memory 1410 such as ROM, EPROM, EEPROM, which BIOS contains the basic routines that help to transfer information between elements within the computer 1402, such as during start-up. The RAM 1412 can also include a high-speed RAM such as static RAM for caching data.

The computer 1402 further includes an internal hard disk drive (HDD) 1414 (e.g., EIDE, SATA), which internal hard disk drive 1414 may also be configured for external use in a suitable chassis (not shown), a magnetic floppy disk drive (FDD) 1416, (e.g., to read from or write to a removable diskette 1418) and an optical disk drive 1420, (e.g., reading a CD-ROM disk 1422 or, to read from or write to other high capacity optical media such as the DVD). The hard disk drive

1414, magnetic disk drive 1416 and optical disk drive 1420 can be connected to the system bus 1408 by a hard disk drive interface 1424, a magnetic disk drive interface 1426 and an optical drive interface 1428, respectively. The interface 1424 for external drive implementations includes at least one or both of Universal Serial Bus (USB) and IEEE 1394 interface technologies. Other external drive connection technologies are within contemplation of the subject specification.

The drives and their associated computer-readable media provide nonvolatile storage of data, data structures, computer-executable instructions, and so forth. For the computer 1402, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the example operating environment, and further, that any such media may contain computer-executable instructions for performing the methods of the specification.

A number of program modules can be stored in the drives and RAM 1412, including an operating system 1430, one or more application programs 1432, other program modules 1434 and program data 1436. All or portions of the operating system, applications, modules, and/or data can also be cached in the RAM 1412. It is appreciated that the specification can be implemented with various commercially available operating systems or combinations of operating systems.

A user can enter commands and information into the computer 1402 through one or more wired/wireless input devices, e.g., a keyboard 1438 and a pointing device, such as a mouse 1440. Other input devices (not shown) may include a microphone, an IR remote control, a joystick, a game pad, a stylus pen, touch screen, or the like. These and other input devices are often connected to the processing unit 1404 through an input device interface 1442 that is coupled to the system bus 1408, but can be connected by other interfaces, such as a parallel port, an IEEE 1394 serial port, a game port, a USB port, an IR interface, etc.

A monitor 1444 or other type of display device is also connected to the system bus 1408 via an interface, such as a video adapter 1446. In addition to the monitor 1444, a computer typically includes other peripheral output devices (not shown), such as speakers, printers, etc.

The computer 1402 may operate in a networked environment using logical connections via wired and/or wireless communications to one or more remote computers, such as a remote computer(s) 1448. The remote computer(s) 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wired/wireless connectivity to a local area network (LAN) 1452 and/or larger networks, e.g., a wide area network (WAN) 1454. Such LAN and WAN networking environments are commonplace in offices and companies, and facilitate enterprise-wide computer networks, such as intranets, all of which may connect to a global communications network, e.g., the Internet.

When used in a LAN networking environment, the computer 1402 is connected to the local network 1452 through a wired and/or wireless communication network interface or adapter 1456. The adapter 1456 may facilitate wired or wireless communication to the LAN 1452, which may also include a wireless access point disposed thereon for communicating with the wireless adapter 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wired or wireless device, is connected to the system bus 1408 via the serial port interface 1442. In a networked environment, program modules depicted relative to the computer 1402, or portions thereof, can be stored in the remote memory/storage device 1450. It will be appreciated that the network connections shown are example and other means of establishing a communications link between the computers can be used.

The computer 1402 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11(a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10 BaseT wired Ethernet networks used in many offices.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a processor;
   an indicator component configured to associate an estimated completion entry with a representation of a likelihood of the estimated completion entry being a correct entry;
   an explanation component configured to associate the estimated completion entry with a rationale for placement of the estimated completion entry in a list of estimated completion entries, by accessing additional data related to a user providing a portion of an entry to which the estimated completion entry is generated, the rationale explaining why a particular estimated completion entry is presented as the estimated completion entry in view of the accessed additional data;

a production component configured to combine the estimated completion entry with the rationale;

a transfer component configured to emit, to an auxiliary location, the combined estimated completion entry and the associated rationale;

a calculation component configured to:
   determine the likelihood of the estimated completion entry being correct based on a subject matter of previously-received input entries from the user, wherein the previously received input entries do not comprise a portion of the estimated completion entry, wherein the previously received input entries are complete input entries and wherein the subject matter does not include characters of the estimated completion entry; and
   determine that the estimated completion entry has a high likelihood of being correct in response to the estimated completion entry being related to the subject matter of the previously-received input entries.

2. The system of claim 1, wherein the auxiliary location is a presentment component configured to present the representation.

3. The system of claim 1, wherein the representation of the likelihood is a visual representation.

4. The system of claim 1, further comprising an approximation component configured to create the estimated completion entry from an input entry that is at least partially completed.

5. The system of claim 4, further comprising artificial intelligence configured to make at least one inference, at least one determination or at least one of each of an inference and a determination in relation to the association of the estimated completion entry with the representation of the likelihood.

6. The system of claim 1, further comprising a selector component configured to choose the representation of the likelihood for association with the estimated completion entry.

7. The system of claim 1, further comprising a feedback component configured to gather reaction information that relates to the association of the estimated completion entry with the representation of the likelihood.

8. The system of claim 1, further comprising a rank component configured to order at least one estimated completion entry.

9. The system of claim 1, further comprising an assurance component configured to integrate at least one criterion for engagement with the estimated completion entry associated with the representation.

10. A computer-implemented method, comprising:
   executing by a processor, instructions that, when executed, cause operations to be performed comprising:
      receiving an input of characters representing at least a portion of a word;
      positioning at least one projected conclusion expression in a subset, wherein the at least one projected conclusion expression represents a possible completion of the word wherein at least one of the at least one projected conclusion expressions is an expression that is topically related to one of the at least one projected conclusion expressions, but does not include the received input of characters;
      incorporating at least one demonstration to the at least one projected conclusion expression, wherein the at least one demonstration relates to at least one criterion used to position the at least one projected conclusion expression;
      calculating a value for the at least one projected conclusion expression; and
      disclosing the at least one projected conclusion expression incorporated with the at least one demonstration and disclosing information indicating a reason for the value for the at least one projected conclusion expression, wherein the reason explains why the at least one projected conclusion expression is provided, and wherein the reason is based at least in part on a data associated with previous activities conducted by a user.

11. The computer-implemented method of claim 10, further comprising receiving a participation expression on which to base the at least one projected conclusion expression.

12. The computer-implemented method of claim 10, wherein the value is used in positioning the at least one projected conclusion expression in the subset.

13. The computer-implemented method of claim 10, further comprising selecting a projected conclusion expression for presentment based, at least, on a participation expression.

14. The computer-implemented method of claim 10, further comprising gathering response data to positioning of the at least one projected conclusion in the subset, incorporating the at least one demonstration to the at least one projected conclusion expression, wherein at least one criterion is used to position the at least one projected conclusion expression.

15. The computer-implemented method of claim 10, further comprising integrating at least one circumstance for commitment with the at least one projected conclusion expression.

16. The computer-implemented method of claim 10, wherein the demonstration is an image demonstration.

17. The system of claim 1 wherein the subject matter of previously-received input entries is a topical subject matter.

18. The computer implemented method of claim 10 wherein information indicating the reason for the value for the at least one projected conclusion expression is disclosed separate from at least one projected conclusion expression.

19. The computer implemented method of claim 10 wherein the reason comprises a written explanation.

20. A method executed by at least one processor that when executed, cause operations to be performed comprising
   receiving a portion of text representative of a desired entry;
   determining a list of estimated completion entries, each of the estimated completion entries representative of a possible correct entry for the desired entry, wherein at least one of the list of estimated completion entries does not include the portion of text representative of the desired entry;
   associating a rationale for at least one of the estimated completion entries, the rationale providing information explaining a reason for placing the at least one of the estimated completion entries in the list of estimated completion entries, wherein the rationale is based at least in part on prior activities associated with a user apart from the portion of text; and returning, for display, at least a portion of the list of estimated completion entries including the associated rationale for at least one of the estimated completion entries.

21. A computing system comprising:

a processor;

a user input device configured to permit entry of text;

a display configured to display a list of estimated completion entries and an associated rationale for the at least one of the estimated completion entries, each estimated completion entry representative of a possible correct entry for text received form the user input device, and the rationale providing information explaining a reason for placing the at least one estimated completion entry in the list of estimated completion entries wherein the rationale is based at least in part on prior activities associated with a user apart from the estimated completion entry, wherein at least one of the estimated completion entries is not based on characters of text entered from the user input device.

22. The computing system of claim 21 wherein the estimation completion entries and the associated rationale for the at least one estimated completion entry are received at a different device than the user input device.

23. A computing system comprising:

a processor; and a data storage device including instructions which, upon execution by the processor, cause the processor to:

receive text, the received text comprising a portion of a desired text entry;

generate a list of estimated completion entries based on the received text, each estimated completion entry representative of a possible correct entry for the received text, wherein at least one of the estimated completion entries does not include the portion of the desired text entry;

for at least one of the estimated completion entries, generate an associated rationale providing information explaining a reason for why the at least one estimated completion entry is in the list wherein the rationale is based at least in part on prior activities associated with a user apart from the portion of desired text; and transmit the list of estimated completion entries and the associated rationale for the at least one of the estimated completion entries to a remote computer.

24. The method of claim 20 wherein the rationale further comprises a written explanation for display as the associated rationale.

* * * * *